United States Patent
Shen et al.

(10) Patent No.: US 11,032,432 B2
(45) Date of Patent: Jun. 8, 2021

(54) CORE NETWORKS CONTROLLED TRAFFIC TRANSMISSION IN DUAL/MULTIPLE-CONNECTIVITY SYSTEM

(71) Applicant: NOKIA SOLUTIONS AND NETWORKS OY, Espoo (FI)

(72) Inventors: Yang Shen, Beijing (CN); Weixing Wang, Beijing (CN); Jing He, Beijing (CN); Xiang Xu, Jiangsu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/500,694

(22) PCT Filed: May 8, 2017

(86) PCT No.: PCT/CN2017/083464
§ 371 (c)(1),
(2) Date: Oct. 3, 2019

(87) PCT Pub. No.: WO2018/205094
PCT Pub. Date: Nov. 15, 2018

(65) Prior Publication Data
US 2020/0195784 A1 Jun. 18, 2020

(51) Int. Cl.
*H04M 15/00* (2006.01)
*H04W 76/16* (2018.01)
(Continued)

(52) U.S. Cl.
CPC ........... *H04M 15/66* (2013.01); *H04W 76/16* (2018.02); *H04W 88/06* (2013.01); *H04W 88/16* (2013.01); *H04W 92/14* (2013.01)

(58) Field of Classification Search
CPC ...... H04M 15/66; H04M 15/00; H04M 15/64; H04M 15/8228; H04M 15/58;
(Continued)

(56) References Cited

U.S. PATENT DOCUMENTS 10,462,704 B2 * 10/2019 Rasanen ........... H04W 28/0268
2015/0288828 A1  10/2015 Lim et al.
(Continued)

FOREIGN PATENT DOCUMENTS

CN        105992274 A    10/2016
EP        2 947 936 A1   11/2015
(Continued)

OTHER PUBLICATIONS

International Search Report and Written Opinion dated Jan. 31, 2018 corresponding to International Patent Application No. PCT/CN2017/083464.
(Continued)

*Primary Examiner* — Magdi Elhag
(74) *Attorney, Agent, or Firm* — Squire Patton Boggs (US) LLP

(57) ABSTRACT

This invention relates to a method for Core Network (CN) controlled traffic transmission in a dual/multiple-connectivity system. The method comprises the following steps: receiving a request containing information about a status of dual/multiple connectivity from the radio access network node; determining and providing a policy on a usage of dual/multiple connectivity to the radio access network node. This invention also relates to a system of Core Network (CN) controlled traffic transmission for a dual/multiple-connectivity, an apparatus for Core Network (CN) controlled traffic transmission in a dual/multiple-connectivity system and a non-transitory computer-readable medium with executable instructions for executing the method.

11 Claims, 4 Drawing Sheets

(51) Int. Cl.
 *H04W 88/06* (2009.01)
 *H04W 88/16* (2009.01)
 *H04W 92/14* (2009.01)

(58) Field of Classification Search
 CPC ............ H04M 15/55; H04M 15/8016; H04M 15/8235; H04M 2215/32; H04W 76/16; H04W 76/15; H04W 48/18; H04W 88/10
 See application file for complete search history.

(56) References Cited

U.S. PATENT DOCUMENTS

| | | | |
|---|---|---|---|
| 2017/0048751 A1* | 2/2017 | Rasanen | H04W 8/20 |
| 2017/0071023 A1* | 3/2017 | Kunz | H04W 36/28 |
| 2019/0199860 A1* | 6/2019 | Vikberg | H04W 4/50 |
| 2019/0350027 A1* | 11/2019 | Centonza | H04W 8/24 |

FOREIGN PATENT DOCUMENTS

| | | |
|---|---|---|
| WO | 2015/165540 A1 | 11/2015 |
| WO | WO 2016/078969 A1 | 5/2016 |
| WO | 2016/180477 A1 | 11/2016 |
| WO | 2017/052432 A1 | 3/2017 |

OTHER PUBLICATIONS

3GPP TS 23.401 V13.6.1 (Mar. 2016), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 31, 2016.
European Search Report for corresponding European Application No. 17909520.3.

* cited by examiner

CORE NETWORKS CONTROLLED TRAFFIC TRANSMISSION IN DUAL/MULTIPLE-CONNECTIVITY SYSTEM

TECHNICAL FIELD

The present invention generally relates to Dual/Multiple-Connectivity between two access technologies, such as between NR (New Radio) and LTE (Long Term Evolution), between NR and WLAN (Wireless Local Area Network), etc. In particular, the present invention relates to a method and a system for supporting CN (Core Network) controlled traffic transmission in a Dual/Multiple-Connectivity system.

BACKGROUND ART

In 5G network, operators may wish to provide differentiated services to the subscribers and define multiple levels of LTE and NR usage ratio for subscribers of different grades. For example, when a LTE-NR dual connectivity is applied, the operators may adopt different charging rates and QoS for the usage of LTE access and NR access or a user may e.g. subscribe to different service packages for the usage of LTE access and NR access. Hence, it may be necessary for the operators to have the knowledge on how the UE (User Equipment) is served by LTE or NR, so as to realize the charging on the usage of LTE access and NR access.

As defined in TR 38.801, there are multiple 5G network architecture options for dual-connectivity scenarios, which for example are:

Option 3, 3A and 3X;
Option 4 and 4A; and
Option 7, 7A and 7X.

FIGS. 1-3 show the various dual-connectivity scenarios for these 5G network architecture options. As shown in FIG. 1, a LTE eNB is selected as a MeNB (master eNodeB), while a gNB used in the NR access is a SgNB (secondary gNB). In the 5G network architecture options 3,3A and 3X, the dual-connectivity is implemented between an EPC (Envolved Packet Core) and the LTE eNB or the gNB. In the scenario for the options 4 and 4A shown in FIG. 2, the gNB is selected as the MgNB, while an eLTE eNB is the SeNB. In this case, the dual-connectivity is implemented between an NGC (Next Generation Core) and the gNB or the eLTE eNB. And in the scenario for the options 7,7A and 7X shown in FIG. 3, the eLTE eNB is selected as the MeNB, while the gNB is the SgNB. The dual-connectivity is also implemented between the NGC and the gNB or the eLTE eNB.

Then, in order to charge on the usage of the LTE or NR for these options, the eNB or gNB needs to determine how to split the bearer based on some criterias, e.g. radio resource status, and need to report to the EPC or NGC the usage of LTE and NR.

It is defined in 3GPP 23.401 that the "split bearer" in the E-UTRAN is transparent to the core network entities (e.g. MME (Mobility Management Entity), S-GW etc.). That is, the core network has no influence on whether to set up the NR SCG (Secondary Cell Group) and how to split the bearer. And since the split bearer decision is transparent to the core network entities for e.g. option 3/3X, there's no way for the operator to differentiate the service quality based on charging policy, subscription data or real-time service requirements in dual-connectivity scenarios. Based on the analysis in the above, the split bearer decision control from core network in dual-connectivity scenario is necessary.

SUMMARY OF THE INVENTION

To this end, the present invention introduces a new mechanism for police based charging on the amount of data carried over NR and LTE separately.

In an aspect of the present invention, it is provided a method for CN controlled traffic transmission in a dual/multiple-connectivity system. The method comprises the following steps: receiving a request containing information about a status of dual/multiple connectivity from a radio access network node; determining and providing a policy on a usage of dual/multiple connectivity to the radio access network node.

In another aspect of the present invention, it is provided a system of CN controlled traffic transmission for a dual/multiple-connectivity. The system comprises: a receiving unit to receive a request containing information about a status of dual/multiple connectivity from a radio access network node; a determining and providing unit to determine and provide a policy on a usage of dual/multiple connectivity to the radio access node.

In a further aspect of the present application, it is provided an apparatus for Core Network (CN) controlled traffic transmission in a dual/multiple-connectivity system. The apparatus comprises at least one memory comprising computer program code and at least one processor. The at least one memory and the computer program code are configured, with the at least one processor, to cause the apparatus at least to: receive a request containing information about a status of dual/multiple connectivity from a radio access network node; determine a policy on a usage of dual/multiple connectivity; and provide the policy on the usage of dual/multiple connectivity to the radio access network node.

In a yet further aspect of the present invention, it is provided a non-transitory computer-readable medium with executable instructions stored thereon. When the executable instructions are executed by a processor, these executable instructions perform the method according to the present invention.

Therefore, by implementing the solutions according to the present invention, a core network controlled, police based usage of LTE and NR for the above 5G network architecture options is supported.

Furthermore, it can be applied to LTE and WLAN or NR and WLAN interworking by dual/multiple-connectivity manner.

DESCRIPTION OF THE FIGURES

The invention will be described in more detail with reference to the figures below, wherein.

PREFERRED EMBODIMENTS

When LTE-NR dual connectivity is applied, the operator may adopt different charging rates and QoS for the usage of LTE access and NR access, and a user may subscribe to different service packages for the usage of LTE access and NR access. The operator may define flexible charging and QoS policies to control the adding/removing and bearer split of the NR SCG bearer.

For example, when user consumption of the resource has reached a predefined level or the user has no enough credits to enjoy high level QoS experience, the operator may reduce the QoS, and then it is not allowed to use the NR access until the start of the next billing cycle. In that case, RAN should remove the NR SCG bearer.

Users of different grades, such as Gold, Silver and Brown users, may be subscribed to different QoS. E.g. 5G QoS can only be applied to the Gold users. Then, RAN needs to consider the required QoS before setting up the NR SCG. And the Operator may define a ratio of the "bearer split" based on some result of data analysis, and may recommend a potential reasonable ratio for RAN to consider when the bearer split is performed.

The application server may request the QoS which can be fulfilled by LTE access, NR access or both. The requirement from the application server should be aware by RAN, when RAN decides whether to set up the different RAT SCG and how to split the bearer.

The application server may indicate the preferred access type (that is, LTE, NR or both) and the preferred ratio between LTE access and NR access derived from the charging rate for traffic transmission. For example, a sponsor may request both LTE and NR for the transmission of a specific service with the preferred ratio. In this case, RAN also should consider the requirement from the application server to decide whether to set up the different RAT SCG and how to perform the bearer split.

During the initial 5G deployment, the operator may use various service packages to prompt 5G. For example, the operator may give an LTE user a free 2GByte data service via NR.

The policy decision and charging control are usually performed by PCRF in EPC or PCF in SGC. However, based on the current 3GPP defined mechanism, there's no way for the core network to influence the adding/removing and bearer split of the NR SCG bearer and charging for the respective usage of LTE access and the usage of the NR access when bearers are split is not supported.

The present invention proposes a method to support core network controlled bearer selection and traffic path selection for a dual/multiple-connectivity system.

Figure 1:
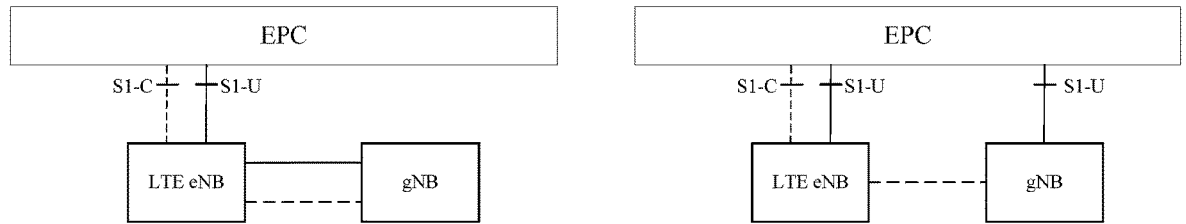
FIG. 1 shows a dual-connectivity scenario for 5G network architecture options 3,3A and 3X.
Figure 2:
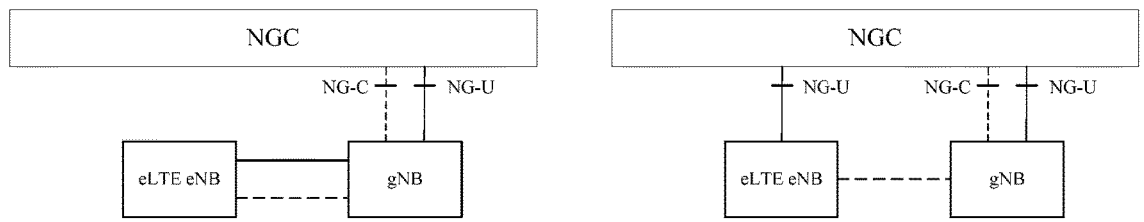
FIG. 2 shows a dual-connectivity scenario for 5G network architecture options 4 and 4A.
Figure 3:
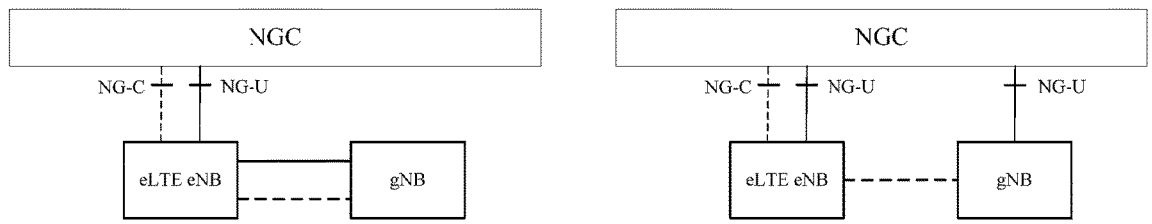
FIG. 3 shows a dual-connectivity scenario for 5G network architecture options 7, 7A and 7X.
Figure 4:
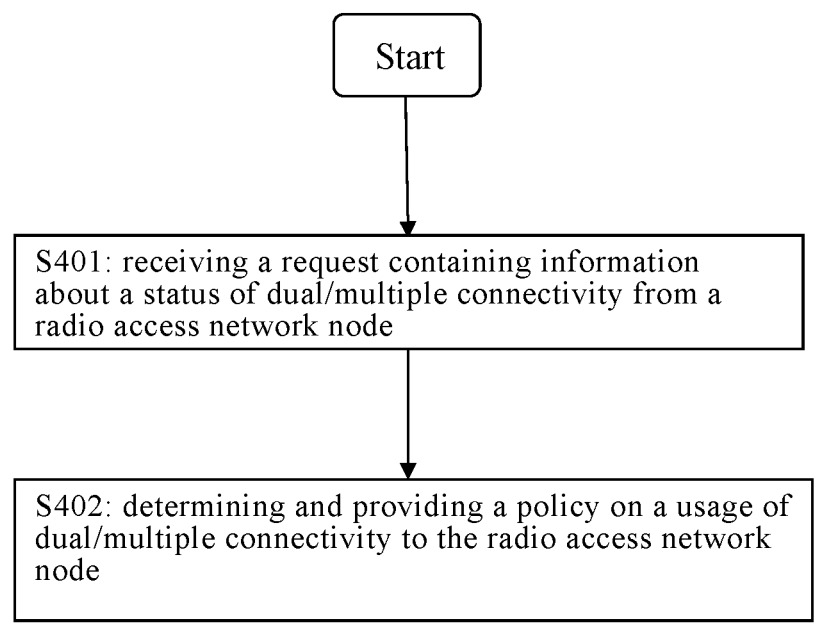
FIG. 4 shows a flow chart of the method for CN controlled traffic transmission in a dual/multiple-connectivity system according to the present invention.

FIG. 4 illustrates a flow chart of the method for CN controlled traffic transmission in a dual/multiple-connectivity system according to the present invention. When an attach procedure starts, an attach request containing information about a status of dual/multiple connectivity initiated by a UE is received in step S401. This may also happen in other scenarios, e.g. during a service request procedure, a service request and information about a status of dual/multiple connectivity are received from a master radio network node in step S401.

The procedure goes to step S402, in which a policy on a usage of dual/multiple connectivity is determined and provided to the master radio network node. Such as, a HSS (Home Subscriber Server)/UDM (User Data Management) is queried to know whether NR access is allowed to be used or not and how the bearer is split.

In order to determine the policy on the usage of dual/multiple connectivity, the UE attach request is forwarded to P-GW (PDN Gateway)/SMF (Session Management Function). And then, the P-GW/SMF requests policy control from a PCRF (Policy and Charging Rules Function)/PCF (Policy Control Function) to determine a dynamic policy on a usage of dual/multiple connectivity (e.g. the preferred bearer split ratio).

The PCRF (Policy and Charging Rules Function)/PCF (Policy Control Function) determines the policy according to relevant information (e.g. the subscription data, operator defined policies, inputs from data analysis, AF request and the UE credits (through the interaction with OCS)). The policies, which correspond to UE subscription data stored in the HSS/UDM, can also be statically preconfigured in the MME (Mobility Management Function)/AMF (Authentication Management Function).

Then, the traffic transmission can be carried out based on the determined policy both in the CN and in the RAN.

Such as, when the UE initiates an attach procedure, the UE and the master radio network node (e.g. LTE eNB, or 5G gNB) informs the core network about its capability of dual/multiple connectivity as the DC Information. That may be performed during the attach or S1 setup procedure.

The DC Information includes, but is not limited to, the following information:
  RAT of master radio network node,
  RAT of secondary radio network node,
  UE's DC capability,
  Bearer split indicator, which indicates whether bearer split is enabled by the master radio network node or the secondary radio network node, and
  Traffic split ratio in split bearer, which is provided for the charging of traffic running on LTE bearer and NR bearer in case of bearer split, with the assumption that accurate packet counting can be performed in the core network.

The DC Information is also used when there's any SCG modification in eNB, eNB needs to notify core network of the change.

The core network control function, e.g. MME/AMF, queries HSS/UDM to know that the UE is allowed to use NR access, and then informs the user plane control function, e.g. S/P-GW-C/SMF. If the UE is not allowed to use NR access, MME/AMF needs to reject the request from eNB/gNB or send restriction information to eNB/gNB.

If PCRF/PCF is deployed, S/P-GW-C/SMF requests policy rules on the usage of dual-access connectivity from PCRF/PCF. Based on relevant information (e.g. the subscription data, operator defined policies, inputs from data analysis, AF request and the UE credits acquired through the interaction with OCS (Online Charging System)), PCRF/PCF determines the dual-connectivity policy. And PCRF/PCF generates the corresponding PCC rules in which the preferred RATs (LTE and/or NR) and the traffic split ratio are included. The traffic split ratio can be derived from the UE credits and the respective charging rates for the usage of LTE access and NR access.

The dual-connectivity policy includes, but is not limited to, the following information:

CN control indicator, which indicates if RAN has to follow the CN policy, allowed Bearer split, which indicates if bearer split is allowed, Traffic split ratio, which indicates how the traffic is split between the RAT of master radio network node and secondary radio network node in split bearer, Reporting indicator, which indicates an interval for eNB to periodically report to MME/AMF the traffic split ratio change in split bearer. This is used when the bearer is split and when the CN policy does not have to be followed. It allows the core network to charge for the usage of LTE bear and NR bearer respectively.

QoS per RAT, which indicates the QoS of each RAT in split bearer, and

Tariff of each RAT in split bearer.

Subsequently, PCRF/PCF sends the dual-connectivity policy over Gx/N7 to P-GW/SMF. And P-GW/SMF associates the preferred RAT to the appropriate bearer or QoS flow based on the PCC rules, or indicates the preferred RAT and traffic split ratio per bearer to the MME/AMF and then to eNB/gNB over S1-C/N2, when two or multiple RATs are allowed. For example, the decision could be either LTE is preferred or NR is preferred, or 40% traffic via LTE and 60% traffic via NR.

This decision may also be dynamically updated by the PCRF/PCF, e.g. according to the interaction with OCS.

Based on the received dual-connectivity policy information, the master radio network node (e.g. eNB or gNB) performs the adding/removing SCG bearers and SCG bearer split based on the received parameters from the policy. If there's any problem when enforcing those core network defined parameters, eNB/gNB needs to inform MME/AMF the failure with the RAN suggested parameters. The policy information may be transferred to target RAN node during the handover.

When PCRF/PCF is notified of the failure of the preferred RAT setup or the traffic split ratio, it needs to decide on whether to stop the procedure or to follow RAN decision to progress with the following steps.

During the service sessions, when either RAN or Core network decides to change the RAT or the traffic split ratio, it needs to inform the peer of the changes.

When PCRF/PCF is notified of the change of the RAT or the traffic split ratio, it needs to decide whether to stop the session or to accept the change suggested by RAN and apply the corresponding charging rate.

For the purpose of charging on the usage of RATs in split bearer, if a RAN node (e.g. eNB/gNB) is authorized by the core network to perform the bear split without following core network preferred traffic split ratio, the RAN node needs to periodically report the traffic split ratio to the core network. The interval for the reporting is indicated by the Reporting indicator in the dual-connectivity policy.

If the RAN node can't enforce the policy suggested by the core network, e.g. modified parameters, the RAN node needs to inform MME/AMF the failure with the RAN suggested parameters. When PCRF/PCF is notified of the failure of the modified RAT or the bearer split ratio, it needs to decide whether to stop the session or to accept the change suggested by RAN and apply the corresponding charging rate.

Figure 5:
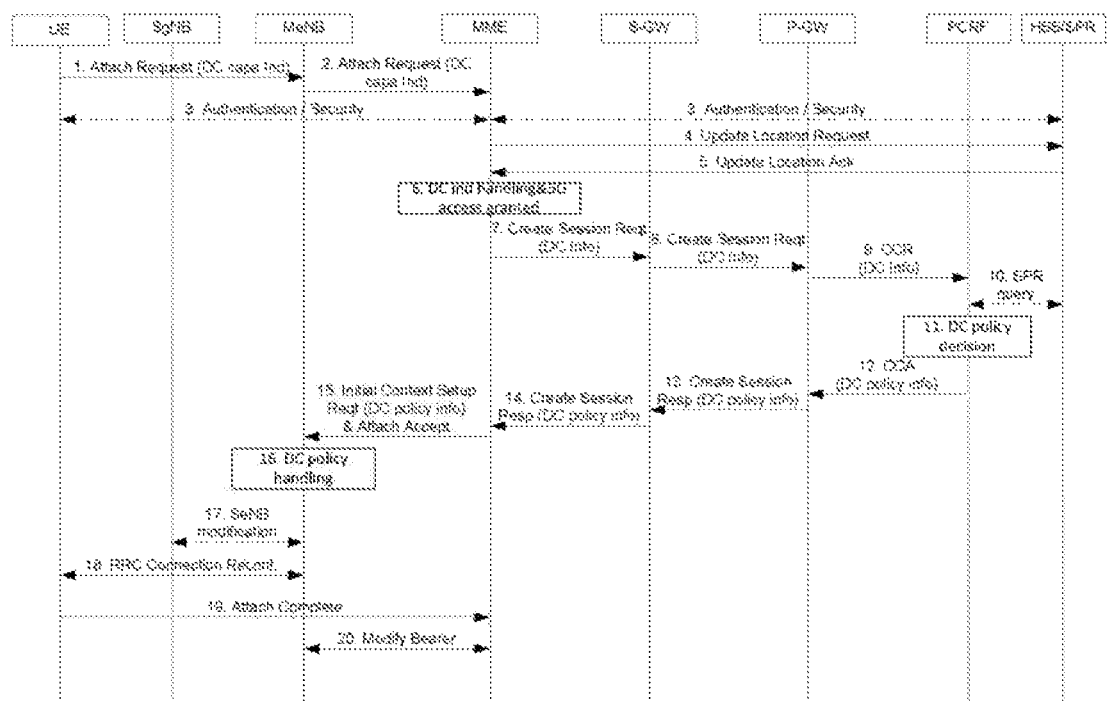
FIG. 5 shows a successful LTE attach procedure with DC policy delivery according to a preferred embodiment of the present invention.

FIG. 5 describes the dual-connectivity policy information transmission during a successful LTE attach procedure in details.

In Step 1, UE indicates its DC capability to RAN. In Step 2, RAN may add its DC Capability when forwarding the UE's DC capability to the MME. In Steps 3-5, Authentication and location is updated based on the information from HSS. In Step 6, MME checks the UE subscription data and grants the use of NR access. In Steps 7-9, DC information is sent to PCRF for policy decision. In Steps 10-11, the PCRF derives the policies based on various inputs, e.g. UE's DC capability, RAN's DC capability, operator policy, UE service package information, AF requests, etc. In Steps 12-15, the PCRF forwards the DC Policy Information to the GW, which is then further forwarded to RAN via MME. In Step 16, MeNB enforces the policy. In Steps 17-20, rest steps are performed to complete the attach procedure. These rest steps may involve a modification procedure initiated by SgNB.

Figure 6:
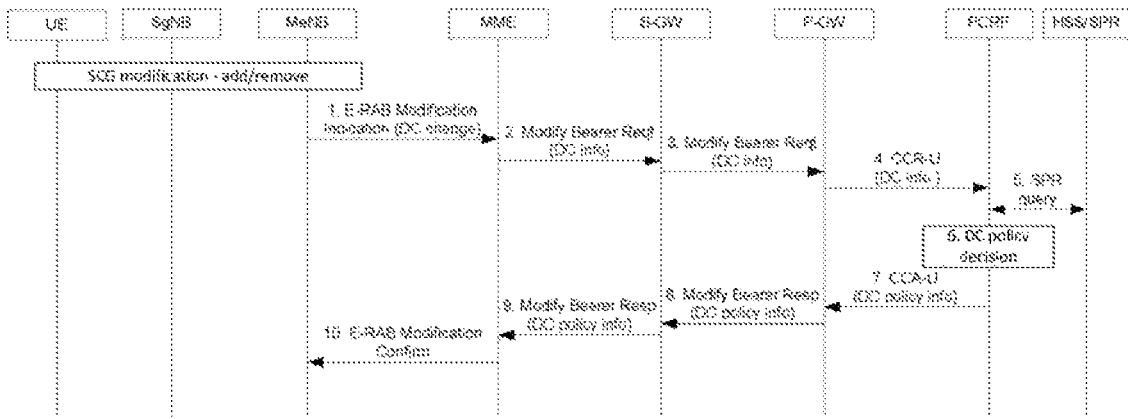
FIG. 6 shows a RAN initiated DC status reporting and DC policy update procedure according to a preferred embodiment of the present invention.

FIG. 6 describes an example for RAN initiated DC status modification/reporting procedure.

The RAN may initiate this procedure when the SgNB is added/removed/modified. This procedure may also be used when RAN would like to propose changes to the previous policy received from the CN, or the result of policy enforcement (e.g. steps 17-20 in FIG. 5), for example, when RAN cannot fulfil the policy received from CN. When PCRF is notified of the failure of the suggested by RAN and apply the corresponding charging rate.

In the RAN initiated DC status reporting and CD policy update procedure, the RAN sends an E-RAB modification indication (i.e., DC change) to MME in Step 1. In steps 2-4, MME forwards the changed DC information to PCRF. In step 5, a SPR query is performed between PCRF and HSS, so that PCRF derives a changed DC policy in step 6. In steps 7-9, PCRD sends the changed DC policy information to MME as a modify Bearer Response. And in step 10, MME confirms the E-RAB modification.

Figure 7:
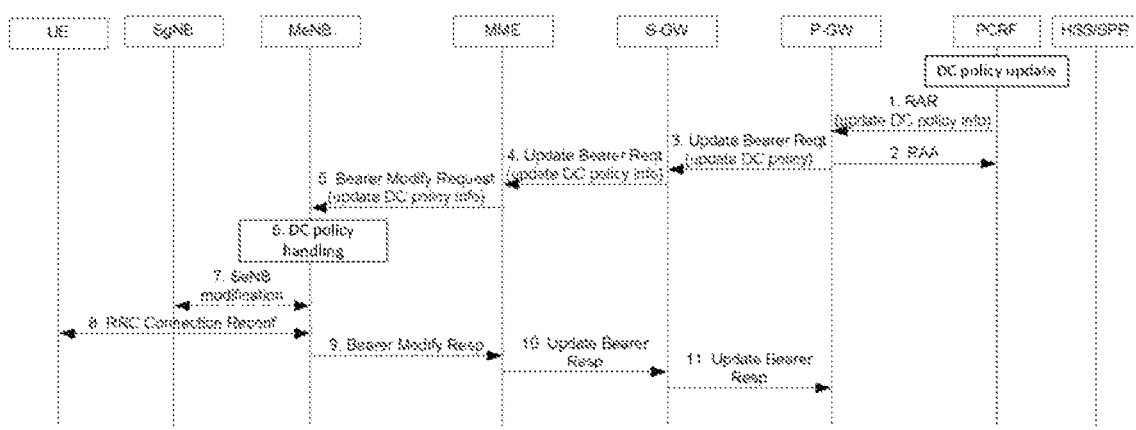
FIG. 7 shows a PCRF initiated DC policy update procedure according to a preferred embodiment of the present invention.

FIG. 7 describes PCRF initiated DC policy update procedure. In such procedure, PCRF updates the DC policy and sends Update Bearer Request to MME in Steps 1-4. After MeNB receives the updated DC policy information from MME in Step 5, MeNB handles the changed DC policy in Step 6. And in Steps 7-11, RRC connection is reconfigured according to the updated DC policy, and Update Bearer Response is sent.

Thereby, the solution according to the present invention supports CN controlled traffic transmission in a dual/multiple-connectivity system as well as supports charging for the traffic running on split bearers. The solution according to the present invention can be applied to the above 5G network architecture options.

In the present invention, "split ratio level" is introduced as subscription data for offline charging on the amount of data carried over NR and LTE. MME needs to be pre-configured with the mapping between "split ratio level" and the concrete split ratio value either in the packet level or in the bearer level.

In the present invention, the split ratio value or split ratio level corresponding to the split ratio value preconfigured in the MME needs to be conveyed from HSS to MME, from MME to eNB and from eNB to gNB. This parameter is used in eNB/gNB as the guidance of bearer split for the 5G network architecture options, and is used in EPC for offline charging on the amount of data carried over NR and LTE.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the spirit and scope of the invention, therefore, reference should be made to the appended claims.

The invention claimed is:

1. A method for core network controlled traffic transmission in a dual/multiple-connectivity system, said method comprising:
receiving, by a mobility management function, a request containing information about a status of dual/multiple connectivity from a radio access network node;
determining, by the mobility management function, a policy on a usage of dual/multiple connectivity; and
providing, by the mobility management function, the policy on the usage of dual/multiple connectivity to the radio access network node, wherein the policy is configured to enable the radio access network node to enforce dual/multiple connectivity by separate charging of a plurality of bearers.

2. The method according to claim 1, wherein the determining further comprises querying a home subscriber server or a user data management to know whether a specific radio access technology access is allowed to be used or not.

3. The method according to claim 1, wherein the determining further comprises forwarding the request to a gateway, and the gateway requesting policy control from a policy control function unit to determine the policy on the usage of dual/multiple connectivity.

4. The method according to claim 1, wherein the policy on the usage of dual/multiple connectivity is determined based on at least one of the following information:
subscription data;
operator defined policies;
inputs from data analysis;
application function requests and user equipment credits, which are acquired through the interaction with an online charging system; and
the status of dual/multiple connectivity.

5. The method according to claim 1, wherein the information about the status of dual/multiple connectivity comprises at least one of the following information:
radio access technology (RAT) of a master radio network node;
RAT of a secondary radio network node;
a capability of dual/multiple connectivity of a user equipment;
a bearer split indicator, the bearer split indicator indicating whether a bearer split is enabled by the master radio network node or the secondary radio network node;
a traffic split ratio in split bearer; and
traffic usage in the radio access network node and the user equipment.

6. The method according to claim 1, wherein the policy on the usage of dual/multiple connectivity comprises at least one of the following information:

a core network control indicator;
an allowed bearer split;
a traffic split ratio;
a reporting indicator indicating an interval for periodically reporting the result of policy enforcement from the radio access network node to the core network;
quality of service per radio access technology; and
tariff of each radio access technology in the split bearer.

7. The method according to claim 1, wherein the traffic transmission is based at least in part on a policy determined in a radio access network (RAN).

8. An apparatus for core network controlled traffic transmission in a dual/multiple-connectivity system, said apparatus comprising:
at least one processor; and
at least one memory including computer program code, wherein
the at least one memory and the computer program code are configured, with the at least one processor, to cause the apparatus at least to:
receive a request containing information about a status of dual/multiple connectivity from a radio access network node;
determine a policy on a usage of dual/multiple connectivity; and
provide the policy on the usage of dual/multiple connectivity to the radio access network node, wherein the policy is configured to enable the radio access network node to enforce dual/multiple connectivity through separate charging of a plurality of bearers,
wherein the apparatus comprises a mobility management function.

9. A non-transitory computer-readable medium having stored thereon computer executable program instructions which, when executed by one or more processors, causes a mobility management function at least to:
receive a request containing information about a status of dual/multiple connectivity from a radio access network node;
determine a policy on a usage of dual/multiple connectivity; and
provide the policy on the usage of dual/multiple connectivity to the radio access network node, wherein the policy is configured to enable the radio access network node to enforce dual/multiple connectivity through separate charging of a plurality of bearers.

10. The apparatus according to claim 8, wherein the at least one memory and the computer program code are further configured, as part of determining the policy on the usage of dual/multiple connectivity, to query a home subscriber server or a user data management to know whether a specific radio access technology is allowed to be used or not.

11. The apparatus according to claim 8, wherein the at least one memory and computer program code are further configured, as part of the determining, to forward the request to a gateway, and cause the gateway to request policy control from a policy control function unit to determine the policy on the usage of the dual/multiple connectivity.

* * * * *